United States Patent [19]

Tank et al.

[11] 3,877,961

[45] Apr. 15, 1975

[54] METHOD FOR INCREASING THE ADHESIVE STRENGTH OF LAYERS APPLIED BY THERMAL SPRAYING

[75] Inventors: Eggert Tank, Fellbach; Franz Pigisch, Beutelsbach, both of Germany

[73] Assignee: Daimler-Benz Aktiengesellschaft, Stuttgart, Germany

[22] Filed: Dec. 18, 1972

[21] Appl. No.: 315,993

[30] Foreign Application Priority Data
Dec. 17, 1971 Germany.............................. 2162699

[52] U.S. Cl. ................. 427/191; 427/201; 427/203
[51] Int. Cl. ............................................. C23c 3/00
[58] Field of Search .......... 117/22, 46 FS, 105.2, 31

[56] References Cited
UNITED STATES PATENTS

| | | | |
|---|---|---|---|
| 2,775,531 | 12/1956 | Montgomery et al. | 117/46 FS |
| 3,006,782 | 10/1961 | Wheildon | 117/46 FS |
| 3,197,335 | 7/1965 | Leszynski | 117/46 FS |
| 3,719,519 | 3/1973 | Perugini | 117/105.2 |

*Primary Examiner*—J. Travis Brown
*Attorney, Agent, or Firm*—Craig & Antonelli

[57] ABSTRACT

A method for increasing the adhesive strength of, in particular, ceramic layers such as aluminum oxide, chrome oxide or nickel oxide and calcium fluoride applied by thermal spraying onto a metallic base, in which the adhesive strength is increased by increasing the surface of the base in that a preferably monogranular layer of metal granulate is applied to the base and non-detachably connected therewith, preferably by soldering or sintering, and the desired layer is thereafter thermally applied over the same.

27 Claims, No Drawings

METHOD FOR INCREASING THE ADHESIVE STRENGTH OF LAYERS APPLIED BY THERMAL SPRAYING

The present invention relates to a method for increasing the adhesive strength of layers, especially of ceramic layers such as aluminum oxide, chrome oxide or nickel oxide and calcium fluoride, applied by thermal spraying on a metallic base support.

A large number of application processes are known in the art in order to apply layers of a number of suitable material on other materials. Thus, for example, a material may be evaporated from its vapor phase by condensation onto a base support. Furthermore, the application, for example, of colored particles onto a metallic base is known in a liquid by an electric field, i.e., by electrophoresis. Furthermore, the application of different substances by chemical or electronic reactions; namely, the chromating, the nitriding, the galvanizing and the anodizing or anodic treatment are not new. As to the rest, substances can also be applied by the use of metallurgical processes; namely, by welding, by plating and by a reaction with a metallic melt. Finally, parts of a material are applied in large volume by purely mechanical means such as immersion or spraying.

An application method in which both a purely mechanical application as also an application by metallurgical methods are used in combined form, is the known method of thermal spraying which, for the most part, is referred to as flame-spraying.

The aim of the present invention is to improve the properties of flame-sprayed layers or coatings.

The principle of this flame-spraying method is generally known. It has the following advantages:

The method is very versatile and makes it possible to apply a large number of different materials on structural parts which in turn may consist of the most varied materials and may have nearly any desired shape. A further advantage of the flame-spraying method is the fact that a structural part to be coated is not heated to high temperatures during the process. As a rule, no thermal after-treatment of the structural part is necessary any more after the coating or formation of the layer or layers.

However, in contradistinction thereto, nearly always a roughening up of the surface to be sprayed is necessary. This measure is necessary especially during the spraying of materials in which the adherence on the structural part is effected predominantly in a purely mechanical manner. For example, the ceramic material such as aluminum oxide (corundum, $Al_2O_3$) and chrome oxide ($Cr_2O_3$) belong to this class of materials. In particular, when these materials are sprayed on metals, a roughening up is necessary or at least of great advantage in many cases.

During the spraying of metals on metals, a certain proportion of the adhesive force of a layer can be effected by a genuine metallurgical bonding which is similar to a welded connection; nevertheless, as a rule a roughening is appropriate or even necessary. The proportion of the metallurgical bonding is very large with the use of so-called adhesive intermediate layers compared to the proportion of purely mechanical bonding. With the use of such intermediate layer materials, such as, for example, of the known nickel-aluminum compounds or alloys or of molybdenum, a roughening of the surface to be sprayed is not necessary. These materials are therefore utilized as adhesive base materials, i.e., as self-bonding adhesive intermediate layers for a subsequent spraying of other materials, especially of ceramic materials. They produce in most cases a sufficiently rough surface on which the spray-materials to be applied thereon adhere well.

However, it may be the case that the necessary roughening of the surface can be carried out only with great difficulties in case of sensitive, very thin-walled metal parts. The customary blasting with corundum (aluminum oxide) or steel shot is eliminated and becomes completely inapplicable because the very sensitive parts would be destroyed thereby. The provision of grooves or a similar enlargement of the surface by recesses, whereby both methods are carried out in most cases in conjunction with an additional increase of the surface roughness by a second operating step, is hardly possible with many parts, especially those having thin wall thicknesses. This is also true for other types of roughening up, such as, for example, those which are realized by electro-erosion, etching or grinding. Furthermore, a spraying of adhesive intermediate layers which is frequently applicable, does not always produce an optimum suited surface profile which assures sufficient anchoring possibilities for the subsequent spray-materials. The surface roughness is admittedly considerably increased by these spraying operations, and with sprayed-on thin layers of the order of magnitude of 0.1 mm., hardly any difficulties occur as regards the manufacture of the spray layers and their loading in conjunction with that of the associated structural part.

If, however, layer thicknesses of a sprayed-on material in the order of magnitude of several tenths of a millimeter or even several millimeters are to be applied, then according to experience, difficulties result during the manufacture of the layers and especially during thermal loading thereof. The stresses in a layer which occur during the manufacture or during loading, or the stresses between the layer and the structural part may readily become larger than the forces which hold together the layer, or the forces which hold fast a layer on a structural part.

These disadvantages of the prior art processes during the application of thicker layers can become noticeable in a disturbing manner especially when ceramic slide- or wear-materials are applied preferably on metallic structural parts and if these materials, primarily when they are used as sliding materials, are thermally particularly highly stressed.

It is the aim and principal object of the present invention to avoid these disadvantages and to increase the adhesive strength of thermally sprayed-on layers, especially on a metallic base, also when they are sprayed-on with self-binding adhesive intermediate layers, in which nonetheless the adhesive strength of the layers on the bases achieved by the surface structure of these materials is not sufficient and therefore has to be increased. The underlying problems are solved according to the present invention in that the adhesive strength is increased by the increase of the surface of the base support, in that a preferably monogranular layer of a metallic granulation is applied on the base support and is non-detachably connected with the base support, primarily by soldering or sintering, and thereafter the provided layer, primarily initially an adhesive intermediate layer, is thermally sprayed on the same.

The granules of the monogranular layer may have irregular outer shapes and grain sizes; however, the grain sizes may also be approximately uniformly large and may have an average diameter of about 0.5 mm. With the thus-produced mono-granular layer the distance of the individual granules is appropriately so selected that the desired optimum surface profiling results. To that end, the individual granules do not, as a rule, lie close to one another on the surface but leave free gaps therebetween so that as many successive height differences as possible result. The grain size and the grain shape of the granulate to be applied may be varied in many ways and can be optimized thereby for the respective application. The metal granules to be applied consist appropriately of a conventional heat-resistant alloy of iron, nickel or cobalt with chrome, molybdenum, tungsten, aluminum or titanium or of the pure metals thereof.

The solder used for soldering the monogranular layer consisting of metal granules may be composed of nickel-boron-silicon to which may be additionally alloyed chromium or iron.

As a rule, a metal granulation of an adhesive intermediate layer consisting of the known nickel aluminide is applied onto the monogranular layer.

For purposes of explanation of the process of the present invention, a practical embodiment will be described more fully hereinafter.

It is known to apply for highly stressed bearings as high temperature sliding material a layer by flame-spraying which consists of a mixture of nickel oxide and calcium fluoride. This material and its processing are described in the German Pat. No. 1,300,460. This material, in order to be effective for a sufficient length of time on or at a structural part, for example, at a sealing ring, has to be sprayed on in greater layer thicknesses, for the most part in an order of magnitude of 1 to 2 mm. The parts, onto which the material is applied, are frequently thin-walled sheet metal parts of heat-resistant material with a surface area of about 1 square meter, for example, with a size up to about 28 inches in length and 14 inches in width or 28 inches in diameter. A surface profiling of such parts by known methods such as blasting, groove-cutting, etching or eroding is completely impossible with such thin-walled starting materials as is readily understandable.

In order to be able to manufacture more easily such structural parts and to be able to use the same with fewer risks, according to the present invention for increasing the surface of the base, especially of the metallic base, onto which the slide materials are sprayed, at first metal granules are applied preferably in a monogranular layer on the base and are non-detachably connected with the base by soldering or sintering. The granules have an irregular outer shape and may have approximately identical diameters of, for example, about 0.5 mm. The utilized solder may be composed of nickel-boron-silicon or of nickel-chrome-boron silicon and the metal granules may consist of heat-resistant alloys on the basis of iron-nickel-cobalt. An adhesive base material as intermediate layer is thermally sprayed on the considerably increased surface which results in this manner and which is profiled in an optimum manner as intermediate layer, and the slide material is then thermally sprayed on this the intermediate layer.

The grain distribution on the surface is thereby so selected that an optimum adherence of the layer is achieved together with the spraying of the adhesive base material.

Circularly shaped sealing rings and D-shaped seals which are coated with nickel oxide and calcium fluoride by thermal spraying are used as seals in heat-exchangers as are used with gas turbines of commercial motor vehicles, such as trucks. Such heat-exchangers include as heat-exchanging medium a rotating disk of glass-ceramic honeycombed matrix (regenerator) which slides along the seals.

A typical example of a method of manufacturing such seals according to the present invention is as follows:

At first a metal-bonding adhesive material of conventional commercially available type which evaporates at elevated temperatures is applied on the metallic surface of the seal which is to be coated with nickel oxide and calcium fluoride. A predominantly monogranular layer of metal granules is uniformly sprinkled on this adhesive either manually or by means of a sieve. The metal granules consist of an alloy of about 75% by weight of nickel, 20% by weight of chrome and 5% by weight of iron. They have an irregular outer shape and an approximate diameter of roughly 0.02 inches. They are retained on the metal by the adhesive. A solder in powder form is sprinkled over this layer of metal granules. The solder may thereby be a hard solder which consists of nickel and includes additionally the following alloying components, the percentages given by weight: about 7% of chrome, 4% of silicon, 3% of iron and 3% of boron. This solder is also retained by the adhesive. The layer consisting of the metal granules is then secured onto the base metal by brazing or hard soldering in a vacuum furnace at a temperature of about 1,150° C. The adhesive evaporates during this operation which lasts about 3 hours.

A nickel-aluminide layer is applied by thermal spraying as adhesive base material resulting in this manner which is considerably enlarged and profiled in an optimum manner. The sliding material consisting of nickel oxide and calcium fluoride is then applied on this adhesive base material by thermal spraying. The layer thickness amounts to about 0.1 inches. Notwithstanding the large layer thickness, the adherence of the material of nickel oxide and calcium fluoride on the coated seal is excellent. The application of the material in this layer thickness is possible without difficulties, and notwithstanding the strong thermal loading in the heat-exchanger, the material does not detach itself from the metal of the seals.

Generally speaking, the monogranular layer of metal granules may consist of a heat-resistant alloy on the basis of iron or nickel or cobalt; this heat-resistant alloy may contain either individually or in any suitable combination 0 to about 30% by weight of chrome, 0 to about 30% by weight of molybdenum, 0 to about 10% by weight of tungsten, 0 to about 6% by weight of aluminum and/or 0 to about 5% of titanium.

The used solder is composed of nickel-boron-silicon to which may also be added either chrome or iron; the solders on the basis of nickel which can be used with the present invention may contain 0 to about 10% by weight of silicon, 0 to about 5% by weight of boron and 0 to about 20% by weight of chrome or 0 to 5% by weight of iron, the remainder essentially nickel.

If sintering is used instead of soldering, conventional sintering techniques are used with the present invention as known to those skilled in the art.

Of course, the metal granules may also consist of any other suitable heat-resistant alloy of any conventional type. Similarly, the composition of the solder may be varied at will as known to those skilled in the art.

Any suitable adhesive may be used, for example, an organic resin dissolved in an organic solvent, such as trichloroethylene. A suitable adhesive of this type is presently commercially available under the tradename "Nicrobraze-Cement."

While we have shown and described only one embodiment of the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A method of increasing the adhesive strength of a ceramic layer to a metallic base which comprises increasing the surface of the metallic base by applying a monogranular layer of metal granules to said base, the individual granules of said layer having free gaps therebetween to provide many successive height differences on the surfaces of said base, and by sintering said monogranular layer to secure said granules onto said base, and then thermally spraying a layer of ceramic onto said monogranular layer.

2. A method according to claim 1, characterized in that the ceramic layer is aluminum oxide, chrome oxide or nickel oxide and calcium fluoride.

3. A method according to claim 1, further comprising the step of thermally applying an adhesive intermediate layer on the monogranular layer while the ceramic layer is thermally applied on the intermediate layer.

4. A method according to claim 3, characterized in that the granulates of the monogranular layer have irregular external shapes and grain sizes.

5. A method according to claim 3, characterized in that the grain sizes are approximately equal and have an average diameter of about 0.5 mm.

6. A method according to claim 3, characterized in that the monogranular layer is constituted by a heat-resistant alloy on the basis of iron or nickel or cobalt.

7. A method according to claim 3, characterized in that the monogranular layer is constituted by a material selected from the group consisting of nickel, iron and cobalt and the alloys thereof.

8. A method according to claim 7, characterized in that the monogranular layer of metal granules consists of a heat-resistant alloy on the basis of a material selected from the group consisting of iron, nickel or cobalt which may contain 0 to about 30% by weight of chrome, 0 to about 30% by weight of molybdenum, 0 to about 10% by weight of tungsten, 0 to about 6% by weight of aluminum and 0 to about 5% of titanium, either individually or in any suitable combination.

9. A method of increasing the adhesive strength of a ceramic layer to a metallic base which comprises increasing the surface of the metallic base by applying a monogranular layer of metal granules to said base, the individual granules of said layer having free gaps therebetween to provide many successive height differences on the surfaces of said base, and by securing said monogranular layer to said base with a solder, and then thermally spraying a layer of ceramic onto said monogranular layer.

10. A method according to claim 9, characterized in that the solder used is composed of nickel-boron-silicon.

11. A method according to claim 10, characterized in that also chromium is added to the solder composition.

12. A method according to claim 11, characterized in that the solder essentially consists of nickel-boron-silicon to which may also be alloyed a material selected from the group consisting of chrome and iron.

13. A method according to claim 12, characterized in that the solder contains 0 to about 20% by weight of chrome, 0 to about 10% by weight of silicon, 0 to about 5% by weight of boron and 0 to about 5% of iron, the remainder consisting essentially of nickel.

14. A method according to claim 9, characterized in that the ceramic layer is aluminum oxide, chrome oxide or nickel oxide and calcium fluoride.

15. A method according to claim 14, characterized in that the monogranular layer of metal granules consists of a heat-resistant alloy on the basis of a material selected from the group consisting of iron, nickel or cobalt which may contain 0 to about 30% by weight of chrome, 0 to about 30% by weight of molybdenum, 0 to about 10% by weight of tungsten, 0 to about 6% by weight of aluminum and 0 to about 5% of titanium, either individually or in any suitable combination.

16. A method according to claim 15, characterized in that the granules of the monogranular layer have irregular external shapes and grain sizes.

17. A method according to claim 15, characterized in that the grain sizes are approximately equal and have an average diameter of about 0.5 mm.

18. A method according to claim 9, characterized in that the solder essentially consists of nickel-boron-silicon to which may also be alloyed a material selected from the group consisting of chrome and iron.

19. A method according to claim 18, characterized in that the solder contains 0 to about 20% by weight of chrome, 0 to about 10% by weight of silicon, 0 to about 5% by weight of boron and 0 to about 5% of iron, the remainder consisting essentially of nickel.

20. A method of increasing the adhesive strength of metal oxide layers to a metallic base which comprises increasing the surface of the metallic base by initially coating said metallic base with a metal bonding adhesive that evaporates at elevated temperatures, by uniformly sprinkling metal granules onto the adhesive layer to provide a monogranular layer of said metal granules thereon, the individual granules of said layer having free gaps therebetween to provide many successive height differences on the surfaces of said base, by sprinkling a powdered solder over the layer of metal granules, the metal granules and the powdered solder being retained on said base by said adhesive, and by bonding said monogranular layer onto said base by soldering under vacuum and at an elevated temperature sufficient to evaporate said bonding adhesive from said base and then thermally spraying a layer of metal oxide onto said monogranular layer.

21. A method according to claim 20, characterized in that the metal oxide layer is a layer of aluminum oxide, chrome oxide or nickel oxide and calcium fluoride.

22. A method according to claim 21, characterized in that a monogranular layer is made up of granules of a heat-resistant alloy having a basis of iron or nickel or cobalt.

23. A method according to claim 21, characterized in that the monogranular layer is made up of a material selected from the group consisting of nickel, iron and cobalt and alloys thereof.

24. A method according to claim 21, characterized in that the monogranular layer of metal granules consists of a heat-resistant alloy on the basis of a material selected from the group consisting of iron, nickel or cobalt which may contain 0 to about 30% by weight of chrome, 0 to about 30% by weight of molybdenum, 0 to about 10% by weight of tungsten, 0 to about 6% by weight of aluminum and 0 to about 5% of titanium, either individually or in any suitable combination.

25. A method according to claim 20, characterized in that the granules of the mono-granular layer have irregular external shapes and grain sizes.

26. A method according to claim 20, characterized in that the solder consists essentially of nickel-boron-silicon or an alloy thereof including a material selected from the group consisting of chromium and iron.

27. A method according to claim 26, characterized in that the solder contains 0 to about 20% by weight of chromium, 0 to about 10% by weight of silicon, 0 to about 5% by weight of boron and about 0 to about 5% by weight of iron on the basis of nickel, the remainder consisting essentially of nickel.

* * * * *